Aug. 7, 1951 C. H. HOEPPNER ET AL 2,562,915

DOUBLE PULSE DISCRIMINATOR

Filed Nov. 13, 1945 3 Sheets-Sheet 1

Inventors
CONRAD H. HOEPPNER
HENRY R. MURPHY
NEIL CLARK, JR.

By Ralph L. Chappell
Attorney

Aug. 7, 1951 C. H. HOEPPNER ET AL 2,562,915

DOUBLE PULSE DISCRIMINATOR

Filed Nov. 13, 1945 3 Sheets-Sheet 2

Inventors
CONRAD H. HOEPPNER
HENRY R. MURPHY
NEIL CLARK, JR.

By Ralph L Chappell
Attorney

DOUBLE PULSE DISCRIMINATOR

Filed Nov. 13, 1945 3 Sheets-Sheet 3

Inventors
CONRAD H. HOEPPNER
HENRY R. MURPHY
NEIL CLARK, JR.
By Ralph L. Chappell
Attorney Patented Aug. 7, 1951 2,562,915

UNITED STATES PATENT OFFICE 2,562,915

DOUBLE PULSE DISCRIMINATOR

Conrad H. Hoeppner, Washington, D. C., Henry R. Murphy, Providence, R. I., and Neil Clark, Jr., United States Navy Application November 13, 1945, Serial No. 628,332

7 Claims. (Cl. 250—27)

(Granted under the act of March 3, 1883, as amended April 30, 1928; 370 O. G. 757)

This invention relates in general to electronic circuits having discriminatory response characteristics and in particular to an electronic circuit for pulse group structure discrimination.

In radio, radio echo ranging, television, and other electronic fields, it frequently occurs that a number of different potential variations may exist at the input to a component electronic circuit either fortuitously or by intention. If all of such variations are not to be impressed upon the component circuit, it is necessary to provide an intervening circuit with the ability to discriminate between those variations intended for ultimate application to the component circuit and those variations the effect of which would be undesirable. Some characteristic or characteristics of the potential variations must be selected as a basis for pulse discrimination and among such characteristics are time duration, polarity, rate of change, and amplitude.

Given such a basis and a suitable intervening circuit, many useful applications may result. For example, a means of pulse coding is provided in which intelligence is conveyed by means of electrical impulses endowed with the chosen characteristic in the form in which it will be favored by the receiver of the message. All those electrical impulses not so endowed, whether they be deliberately introduced so as to disguise a communication for secrecy purposes or reach the receiver from man-made or natural sources so as to constitute accidental or deliberate interference, are rejected by the intervening circuit. An obvious extension of such a pulse coding system is to provide a receiver with a plurality of intervening circuits, each so constructed as to select and favor its particular type of electrical impulses. In this way a multiplicity of communication channels may be provided. The endowment of electrical impulses with the chosen characteristics in the form in which they will be favored does not necessarily operate to prevent a variation in another characteristic which can be put to a useful purpose. Thus, pulses which may be restricted as to time duration and spacing so as to be favored by a pulse group discrimination circuit, may also be amplitude modulated so as to convey intelligence or provide a second means of discrimination.

It is an object of this invention to provide a system for discriminating electrical pulse groups, favoring those having a predetermined duration and spacing and repulsing all others.

It is another object of this invention to provide a circuit which may be employed between a source of potential variations or electrical impulses and the receiver thereof as an intervening circuit which shields from such receiver all variations or pulse groups except those having a certain definite group structure.

Other objects and features of this invention will become apparent upon a careful consideration of the following detailed description when taken together with the accompanying drawings in which.

Figure 1:
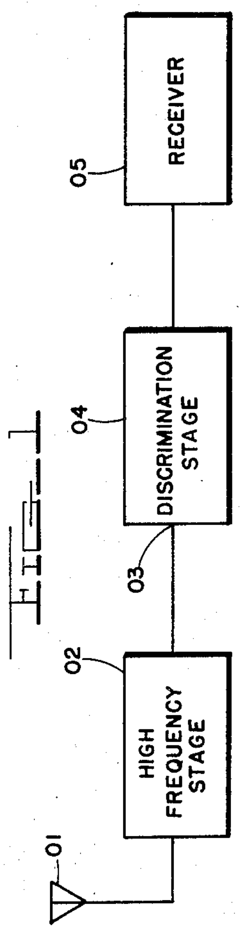
Fig. 1 is a simple block diagram of a pulse receiving system utilizing one embodiment of this invention.

Reference is now had in particular to Fig. 1 which is illustrative of a pulse receiving system wherein a discrimination circuit is employed to repulse undesired video signals. Pulses or bursts of high frequency energy received by antenna 01, amplified and detected by high frequency stage 02 are impressed, in the form of the envelope of the high frequency pulses of energy, to input 03 of discrimination stage 04. Since the pulse groups of high frequency energy reaching antenna 01 may comprise not only a desired signal but also man-made and fortuitous interfering signals of a frequency which high frequency stage 02 will not reject, and since high frequency stage 02 may itself be a source of interfering signal, it is the function of discrimination stage 04 to shield from receiver 05 all pulses not having the group structure characteristics of the desired signal. The output circuit of high frequency stage 02, not shown, is so constructed that only signals of negative polarity and steep leading and trailing edges are applied to input 03. Further, these signals are all of an amplitude such that each drives the first stage of discrimination stage 04 (illustrated in detail in Fig. 2) below cutoff, the result being that, as they are applied to discrimination stage 04, their only substantial difference lies in the characteristic of time duration.

Figure 2:
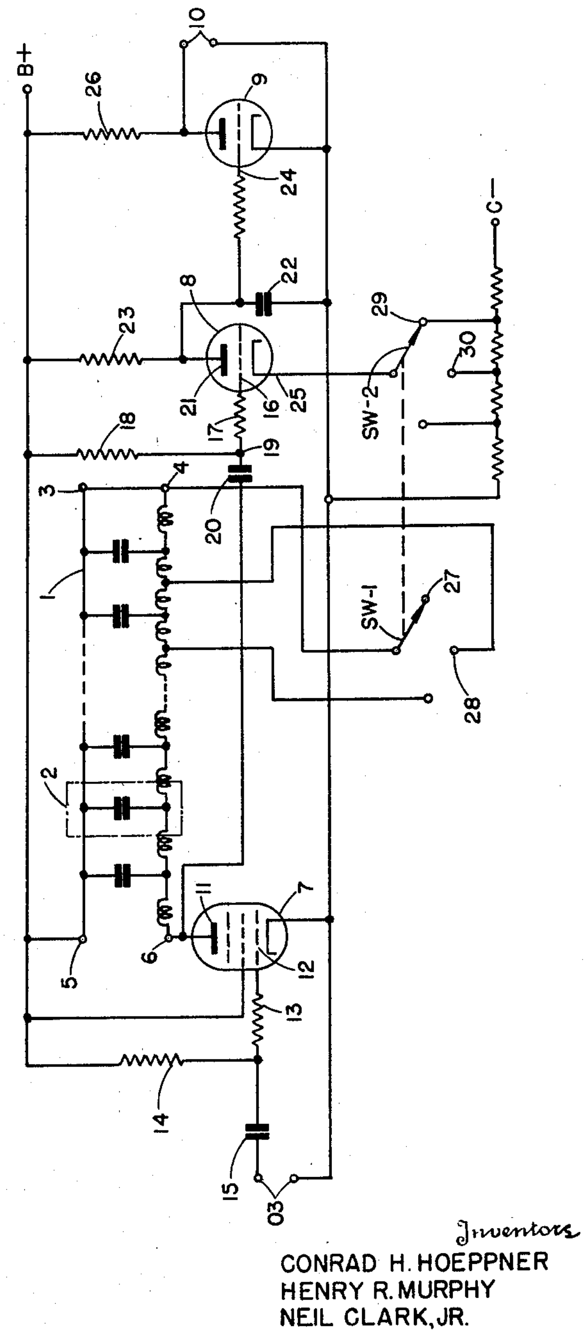
Fig. 2 is the circuit diagram of one embodiment of this invention.

In general, this invention is based upon the principle that an artificial line comprising, for example, a network of a plurality of inductors and capacitors arranged in a manner such as delay line 1 of Fig. 2, may be shock excited in much the same manner as an ordinary L-C oscillatory circuit. This analogy is limited in certain important respects but the concept of energy storage and release holds true for both circuits to the extent that a unitary voltage pulse impressed upon either will excite a wavetrain the nature and perceptible duration of which depends upon the circuit parameters employed, upon the character of the exciting pulse and upon the nature of the source itself. In the case of a simple L-C oscillatory circuit, the wavetrain excited is fundamentally sinusoidal regardless of the nature of the applied pulse. Since it is sinusoidal and of a frequency fixed, essentially, by the respective values of inductance and capacitance, the components of the wavetrain, such as the individual half cycles, are of a duration which is independent of the characteristics of the exciting pulse. On the other hand, an artificial line may be employed to produce wave trains which vary widely as to the duration of components and as to the configuration of such components. In the ideal case of a lossless line, it would theoretically be possible to set up a wavetrain by the application of a voltage pulse which would consist of a series of pulses each of the same configuration and duration as the applied pulse. To the extent that the line is not lossless and the terminations not purely resistive, the wavetrain pulses will suffer distortion. It is possible, by means of an actual transmission line, to approach the performance of the ideal delay line. It is also possible, by means of an artificial line composed, for example, of a ladder network of T-sections of inductance and capacitance, to achieve substantially the same results as with an actual transmission line. This is true at least to the extent that some aspects of its operation may be treated as would those of an ideal line for certain non-rigorous analyses. Such a simplified and practical treatment does, however, require consideration of the progressive attenuation which occurs in an artificial line roughly corresponding to the damping effect in a resonant circuit. It is this attenuation which causes the amplitude of a shocked excited wavetrain to decay and of which advantage is taken to render more effective the pulse group discrimination described herein.

In particular, the circuit of Fig. 2 is representative of a pulse group discriminator constructed according to the teachings of this invention. Delay line 1 is an artificial transmission line comprising a ladder network of a plurality of T sections of which the section enclosed in dotted line box 2 is typical. It will be understood that delay line 1 may take a variety of forms such as a network of pi sections or a network of L sections or, except for length considerations, an actual transmission line. The individual circuit elements of delay line 1 have been chosen such that objectionable pulse distortion is avoided and a characteristic impedance $Z_c$ is provided. The number of T sections employed has been chosen such as to provide a delay $d$ in the passage of a pulse from one end to the other. The line has a short circuit across one end between terminal 3 and terminal 4 and is effectively open circuited at the other end between terminal 5 and terminal 6. While it is true that this open circuited end is shunted by tube 7 in series with the B+ power supply, the fact that a pentode tube is used, with its high A.-C. plate resistance, renders this a high impedance shunt particularly in comparison to the characteristic impedance $Z_c$ of the line. For example, this plate resistance of tube 7 may be of the order of 1,000,000 ohms while $Z_c$ may be of the order of only 500 ohms. Thus, for pulse type operation, delay line 1 may be considered as being open circuited at terminals 5 and 6 and short circuited at terminals 3 and 4.

A voltage pulse impressed upon line 1 between terminals 5 and 6 will travel down the line and reach terminals 3 and 4 after a delay $d$. Since it finds at these terminals not $Z_c$, but rather a short circuit, it will be reflected back toward the incident end of the line. The coefficient of reflection introduced by the short circuit will be $-1$ so that the pulse which moves toward and reaches terminals 5 and 6 after a total delay of $2d$ will be of polarity opposite to that of the originating incident pulse. This reflected pulse will find an open circuit at terminals 5 and 6 and will thus be reflected back toward terminals 3 and 4 without change in polarity since the open circuit provides a reflection coefficient of $+1$. This cycle is repeated in such a manner as to produce a wavetrain of pulses at terminals 5 and 6 of alternate polarity. The spacing between pulses, defined as the time interval between corresponding pulse elements of successive pulses, will be equal to $2d$, twice the delay introduced by a one-way traversal of delay line 1. Whenever hereinafter referred to, "pulse spacing" or "spacing between pulses" will be taken according to the foregoing definition so as to avoid confusion with the possible interpretation of these terms as the time interval between the trailing edge of one pulse and the leading edge of the following pulse. This action may be better understood by reference to waveform 200 of Fig. 3 in which pulse 201 is representative of an originating pulse and pulses 202 through 205 are representative of the resulting wavetrain as it appears across terminals 5 and 6. In this, as in the other waveforms of the same figure, amplitude on the vertical axis has been plotted against time on the horizontal axis all with respect to terminals 5 and 6. The pulse spacing $2d$ has been indicated on waveform 200 as the time interval between the leading edges of successive pulses. It will be noted that the amplitude of pulse 202 exceeds that of the originating pulse and this is to be expected since the amplitude between terminals 5 and 6 during such a pulse as 202 will result, not only from the reflected pulse which reaches it from terminals 3 and 4, but also from the pulse which the open end termination between 5 and 6 reflects back toward 3 and 4. Were there no attenuation of the pulse as it traversed the line, pulse 202 would be double pulse 201 in amplitude. Attenuation reduces the amplitude of pulse 202 below the theroretical double of that of pulse 201 just as it progressively reduces the amplitude of pulses 203, 204, and 205 with respect to pulse 202. It is to be understood that, had a midpoint section of the line been chosen and the wavetrain observed at that point, there would have been no reflective superposition and pulses 202, 203, 204 and 205 would have had progressively smaller amplitudes than originating pulse 201. Examination of waveform 200 reveals that pulse 201 may be said to have produced pulse 202 of equal duration, opposite polarity and delayed therefrom by a predetermined interval equal to $2d$. Likewise, pulse 202 may be said to have produced pulse 203 and it, in turn, to have produced pulse 204. By the same reasoning, pulse 201 may be said to have produced pulse 204 of equal duration, opposite polarity and delayed therefrom by a predetermined interval equal to $6d$.

If there had been applied to terminals 5 and 6 a second pulse following pulse 201, such as pulse 211 of waveform 210, a second wavetrain would have resulted as represented by pulses 212 through 214 and the two wavetrains would have combined to produce waveform 220 at terminals 5 and 6.

An examination of waveform 220 reveals that the time interval between the two originating pulses 201 and 211 determined certain characteristics of waveform 220. For example, if the second originating pulse had been spaced 4*d* from pulse 201 as in the case of pulse 231 of waveform 230, the combination would have resulted in the amplitude reinforcement illustrated by waveform 240. Of particular interest in waveform 240 is pulse 244 which resulted from the reinforcement of the third pulse of the wavetrain excited by pulse 201 by the first pulse of the wavetrain excited by pulse 231. Pulse 244 will be seen to have the maximum negative amplitude MA which can be achieved by any such reinforcement of two wavetrains. It serves to point up the fact that, in order for two pulses to cause a reinforcement of this maximum amplitude, their spacing must be such that the second pulse has at least some portion spaced in time 4*d* from some portion of the initial pulse. The greater the portion of the second pulse spaced 4*d* from some portion of the initial pulse, the greater will be the interval during which the reinforcement of maximum amplitude will occur. If no portion of the second pulse is spaced 4*d* from the initial pulse, as was the case of pulse 211, no reinforcement occurs. If all of the second pulse is spaced 4*d* from some portion of the initial pulse, as was the case of pulse 231, the maximum amplitude MA persists for the duration of the second pulse.

It will now be obvious that, since only a certain spacing of two originating pulses causes the reinforcement necessary to create the maximum amplitude MA indicated by pulse 244, an amplitude device which remains quiescent except when receiving a signal of amplitude MA may be employed to detect the fact that, of two successive pulses applied to delay line 1, the second pulse has at least a portion spaced 4*d* from some portion of the first pulse.

It will also now be obvious that a wide variety of two pulse groups would satisfy the immediately foregoing conditions of spacing. For example, two narrow pulses or one wide and one narrow pulse or two wide pulses acting as originating pulses could, if properly spaced, cause the amplitude reinforcement indicated by waveform 240.

In this invention, in order to reduce the originating pulse group configurations which can produce an output signal, additional conditions of pulse width are imposed. Inasmuch as the conditions of spacing hereinbefore stated require that some portion of the second pulse be spaced 4*d* from the same portion of the first pulse, it would appear that increasing the respective portions would increase the duration of the pulse resulting from reinforcement. This is true up to the limit of two pulses each having a width of 2*d* spaced 4*d*. The reinforcement which results from two such pulses is indicated by pulse 274 of waveform 270 of Fig. 3. Pulse 251 of waveform 250 is the first of the two pulses and pulses 252 through 255 represent the wavetrain it excites. Pulse 261 of waveform 260 is the second of the two pulses and pulses 262 and 263 represent the wavetrain it excites. Examination of waveforms 250, 260, and 270 indicates one of the reasons why originating pulses of a duration greater than 2*d* do not result in a combined waveform which includes a pulse possessing both the maximum amplitude MA and the maximum duration 2*d* possessed by pulse 274. For example, waveform 280 of Fig. 4 represents an originating pulse 281 of duration 3*d* while pulse 291 of waveform 290 represents the reflection of pulse 281 as it returns from terminals 3 and 4. Likewise, pulse 301 of waveform 300 represents the reflection of pulse 291, pulse 311 of waveform 310 represents the reflection of pulse 301, and pulse 321 of waveform 320 represents the reflection of pulse 311. It will be seen that when the pulse length exceeds 2*d*, the first reflection arrives back at the incident terminals before the originating pulse disappears. Similarly, each pulse in the wavetrain arrives back at terminals 5 and 6 before the preceding pulse has disappeared. The interference thus occasioned results in production of waveform 330. Now, a second pulse of width 3*d* spaced 4*d* from pulse 281 would set up a similar wavetrain spaced in time 4*d* as indicated by waveform 340. The combination of waveforms 330 and 340 results in waveform 350. Element 351 of waveform 350 reaches amplitude MA but only for an interval of 1*d*. The interference resulting from the overlength pulses producing waveforms 330 and 340 operated to reduce the maximum amplitude duration from 2*d* to 1*d*.

If the analogy between delay line 1 and an LC oscillator circuit were pursued further, it would be found that there exists certain third harmonic relationships which will provide a duration of reinforcement equal to 2*d*. For example, an originating pulse group impressed at terminals 5 and 6 comprising a first pulse of duration 2*d* and a second pulse of duration 6*d* (rather than 2*d*) with with a spacing of 4*d* would operate to produce wavetrains which would reinforce each other for a full interval of 2*d*. It would be found, however, that this reinforcement occurs, not in the manner illustrated in waveform 270, but a time such that the progressive attenuation of the delay line has rendered the reinforced pulse incapable of attaining amplitude MA. In the particular harmonically constituted originating pulse group described above, the fifth (rather than the third) pulse in the wavetrain excited by the first pulse would be reinforced by the third (rather than the first) pulse in the wavetrain excited by the second pulse. In general, all such harmonically related pulse groups result in attenuated reinforcement and it is necessary to return to an originating pulse group comprising a first and second pulse each of duration 2*d* spaced in time 4*d* in order to secure a reinforced pulse of amplitude MA for a full interval 2*d*.

Reverting now to tube 7 of Fig. 2, in the plate circuit of which is disposed delay line 1, it will be seen that grid 12 is so connected to B+ potential through resistors 13 and 14 as to cause tube 7 to be conducting heavily in the quiescent condition of the circuit. Negative pulses applied to input terminals O3 from high frequency stage O2 of Fig. 1 will, however, bias tube 7 below cutoff and cause corresponding positive pulses to appear at anode 11 (and across terminals 5 and 6 of delay line 1). The values of capacitor 15 and resistor 14 have been chosen such that capacitor 15 receives negligible charge during any applied pulse.

Figure 3:
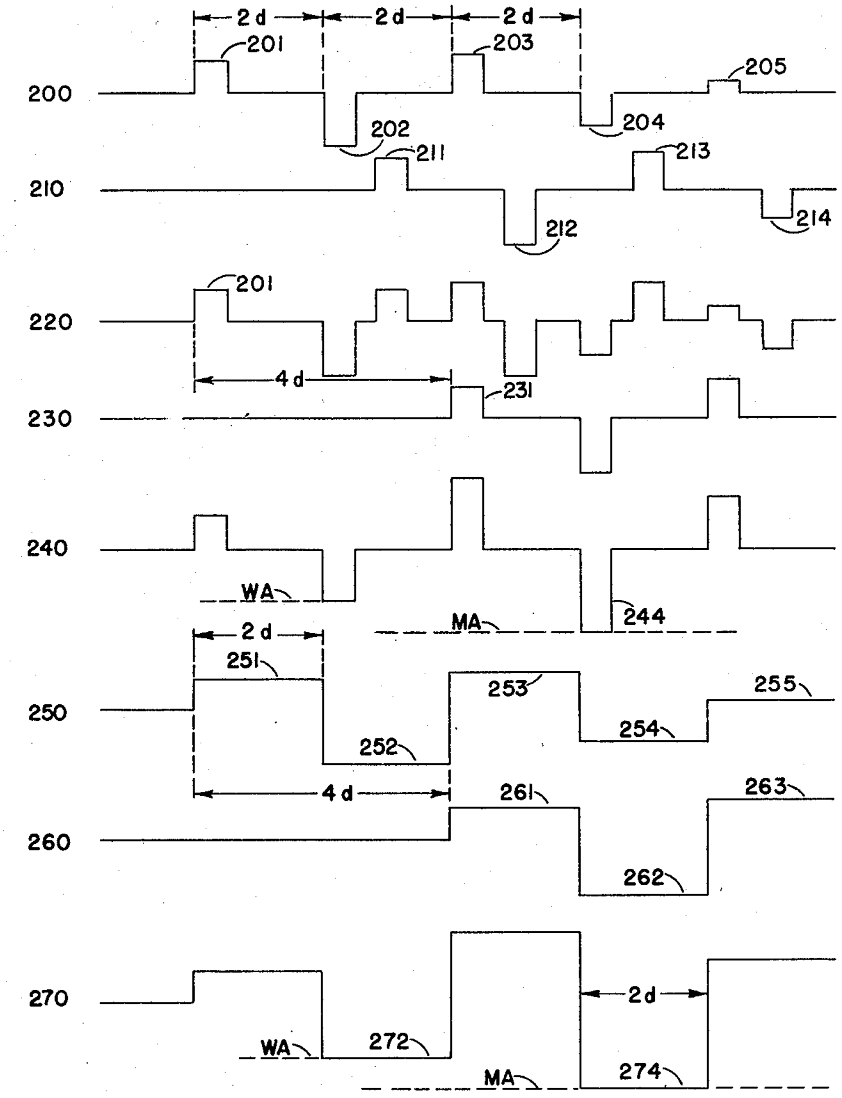
Figs. 3, 4 and 5 are a series of waveforms useful in explaining the operation of the circuit of Fig. 2.
Figure 4:
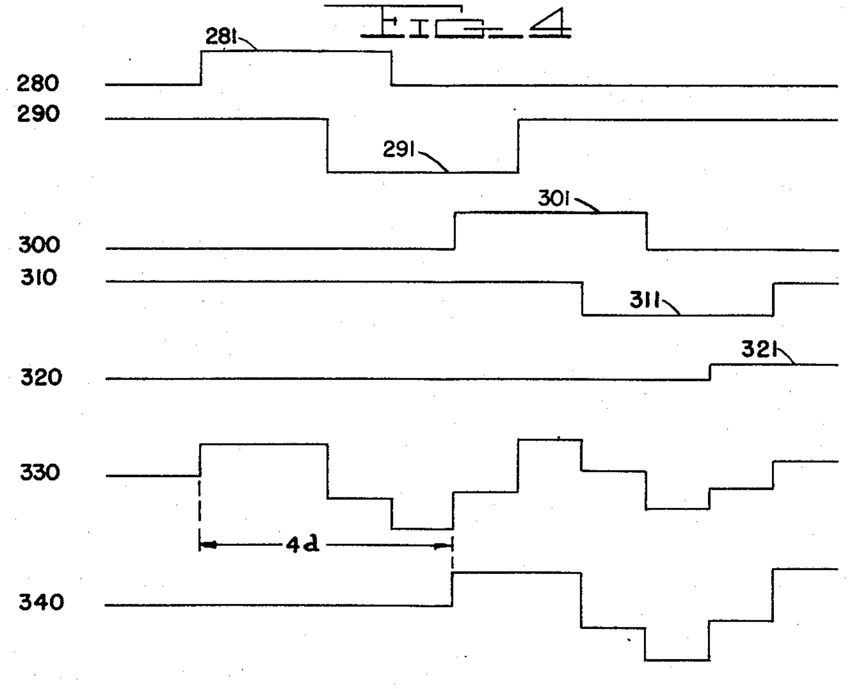

The appearance of such positive pulses at anode 11 and their impression across delay line terminals 5 nad 6 results in the production of combined wavetrains such as waveforms 220, 240, 270 of Fig. 3 and 350 of Fig. 4.

It will be seen that, if a means be provided to detect at anode 11 only the presence of a negative pulse of amplitude MA and duration not less than $2d$, the entire circuit of Fig. 2 will then function to detect at input O3 only the presence of a pulse group comprised of two pulses of duration $2d$ and spaced $4d$. One such means is represented by tubes 8 and 9 and their associated components. The operation of this means is described in detail in the copending application of Conrad H. Hoeppner, Serial No. 608,804, filed August 3, 1945, for "Pulse Width Discriminator," and issued December 19, 1950, as U. S. Patent No. 2,534,264. Briefly, however, grid 16 of tube 8 is so biased by connection to B+ potential through resistors 17 and 18 that tube 8 conducts strongly until a negative signal of amplitude sufficient to overcome the positive potential established at juncture 19 by grid current flow appears at anode 11 of tube 7 and is communicated to juncture 19 by capacitor 20. Until a negative signal of the required amplitude is applied to juncture 19, the conducting condition of tube 8 remains substantially unchanged. Thus, with resistors 17 and 18 so chosen as to produce a potential at juncture 19 greater than the potential level reached by any component of a combined waveform at anode 11 except amplitude MA of waveform 270, tube 8 rejects weaker signals such as pulse 272 of waveform 270 having amplitude MA. Tube 8 may be chosen as a sharp cutoff tube so that negative pulses of amplitude MA not only overcome the positive potential at juncture 19 but overcome it sufficiently to drive the potential of grid 16 below cutoff and thereby place tube 8 in a non-conducting state for the duration of such pulses. In this manner, the feature of amplitude responsiveness or selectivity is introduced into the circuit so that the effect is to render all variations at anode 11 impotent which do not result from a reinforcement of maximum amplitude.

When a pulse of amplitude MA is applied to juncture 19, anode 21 of tube 8 undertakes to rise abruptly to B+ potential. This abrupt rise is tempered by the necessity of charging capacitor 22 through resistor 23 which have been so chosen as to cause an almost linear increase in potential at anode 21 in response to a signal which renders tube 8 non-conducting. Thus, tube 8 and its immediately associated circuit elements comprise a sawtooth generator and produce a signal the amplitude of which varies as the duration of the biasing pulse applied to juncture 19. The greater the duration of the pulse applied to juncture 19, the greater will be the amplitude of the sawtooth signal appearing at anode 21 and applied to grid 24 of tube 9. It will be apparent that a negative voltage may be chosen for the cathode 25 of tube 8 such that only a pulse at juncture 19 of duration $2d$ will hold tube 8 cut off for a long enough time to permit anode 21 to reach a high enough potential to permit tube 9 to conduct. When tube 9 so conducts, the flow of current through resistor 26 produces a negative signal at output terminals 10.

Figure 5:
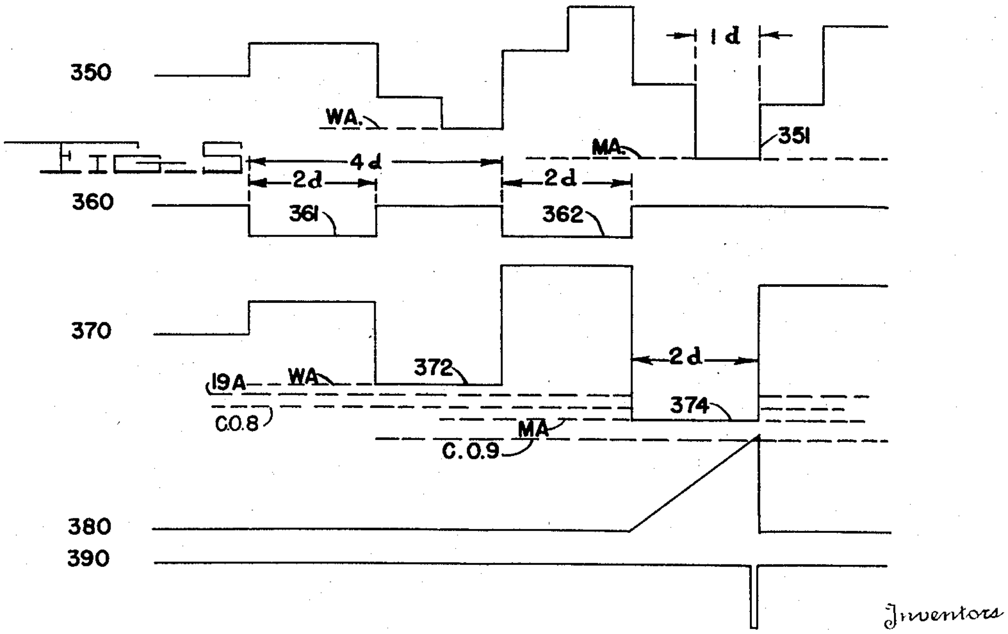

The foregoing action may be better understood by reference to the waveforms of Fig. 5 in which waveform 360 is representative of the pulse group which the circuit of Fig. 2 was designed to favor. First pulse 361 and second pulse 362 both have durations of $2d$ and are spaced $4d$. In the manner hereinbefore explained, each cuts off tube 7 for its duration so as to cause the production of the combined wavetrain illustrated by waveform 370 at anode 11 (waveform 370 is the same as waveform 270 of Fig. 3). On waveform 370 has been superposed the potential level 19A which must be exceeded at juncture 19 before the conducting state of tube 8 is affected. On this same waveform level C. O. 8 indicates the potential which must be reached to cut off tube 8. Negative pulse 372 fails to disturb tube 8 and therefore is rejected on the basis of insufficient amplitube. Pulse 374, resulting from the reinforcement of the third pulse of the wavetrain excited by pulse 361 by the first pulse of the wavetrain excited by pulse 362, and having amplitude MA, cuts off tube 8 for interval $2d$. During this interval the potential at anode 21 of tube 8 rises to produce sawtooth waveform 380. On this waveform 380 has been superposed potential level C. O. 9 to which anode 21 must rise before tube 9 is rendered conducting to produce the signal at output 10 illustrated by waveform 390.

If the pulse group applied to input O3 had consisted of the pulses producing combined waveform 220 or 240 of Fig. 3 or 350 of Fig. 4, the interval of time during which tube 8 would have been cut off would not have allowed the potential of anode 21 of tube 8 to reach level C. O. 9 and cause an output signal at terminals 10. Furthermore, if one of the harmonically constituted pulse groups hereinbefore described had been applied to input O3, the lower amplitude resulting would have been rejected as was pulse 372 of waveform 370.

Since it may be desirable to provide flexibility in the pulse group to be favored, means for altering the elements of discrimination may be employed. Such means are represented in Fig. 2 by switches SW1 anl SW2. These switches may be mechanically ganged as shown so that when SW1 is moved to position 28 from position 27, for example, to short out a section of delay line 1 and reduce the value of delay $d$, the negative potential at cathode 25 of tube 8 is reduced by movement of SW2 to position 30 from position 29. This reduced negative potential at cathode 25 permits the then shorter interval represented by $2d$ to cause tube 9 to conduct and cause an output signal.

The amplitude and duration responsive means represented in general by tubes 8 and 9 may be replaced by other means designed to accomplish the same purpose. Such a replacement means would comprise a negatively biased diode receiving the signals at anode 11 of tube 7 and conducting only in response to signals exceeding a predetermined amplitude. The resulting conduction by the diode could then act as the input signal to any of several known pulse width discriminators. To those well versed in the art will occur other changes, such as different dispositions of the delay line in the circuit of the driving tube. The use of arrangements such as cathode follower or transformer drivers does not, however, call into play principles other than those upon which this invention is based.

It will be apparent that a pulse group discrimination circuit constructed in accordance with the teachings of the invention will have a wide variety of applications in radio, radio echo ranging, television, and other electronic fields whenever discrimination between voltage variations is desirable and the time durations of individual variations in a group of pulses can be used as the basis for such discrimination. It will also be apparent that a pulse group discrimination circuit constructed as taught by this invention may be used in combination with other circuits, also discriminatory in response, whose action is based on other characteristics of the input signal such as amplitude, polarity, or rate of change.

Since certain further changes may be made in the foregoing constructions and different embodiments of the invention may be made without departing from the scope thereof, it is intended that all matter shown in the accompanying drawings or set forth in the accompanying specification shall be interpreted as illustrative and not in a limiting sense.

The invention described herein may be manufactured and used by or for the Government of the United States of America for governmental purposes without the payment of any royalties thereon or therefor.

What is claimed is:

1. A method of selecting pulses having a desired pulse interval comprising, delaying each pulse of an incoming pulse group for an interval half the desired pulse interval and reversing its polarity, delaying each delayed pulse for an interval half the desired pulse interval and reversing its polarity, delaying each twice delayed pulse for an interval half the desired pulse interval and reversing its polarity, combining the incoming pulses and all delayed pulses, producing an output in response to coincidence between pulses of polarity opposite to that of the incoming pulses.

2. A method of selecting pulses having a desired pulse interval and pulse duration comprising, delaying each pulse of an incoming pulse group for an interval half the desired pulse interval and reversing its polarity, delaying each delayed pulse for an interval half the desired pulse interval and reversing its polarity, delaying each twice delayed pulse for an interval half the desired pulse interval and reversing its polarity, combining the incoming pulses and all delayed pulses, producing a signal in response to and for the duration of coincidence between pulses of polarity opposite to that of the incoming pulses, producing an output in response to coincidence signals of the desired duration.

3. A method of selecting pulse pairs having the desired pulse interval comprising, producing in response to the first pulse of an incoming pulse pair an inverted pulse delayed half the desired pulse interval, producing in response to the first produced pulse a second produced pulse again inverted and delayed half the desired pulse interval, producing in response to the second produced pulse a third produced pulse again inverted and delayed half the desired pulse interval, producing in response to the second pulse of the incoming pulse pair a fourth produced pulse inverted and delayed half the desired pulse interval, combining all said produced pulses, and producing an output in response to the occurrence of coincidence between said third and fourth produced pulses.

4. A method of selecting pulse pairs having a predetermined interval and duration comprising, producing in response to the first pulse of an incoming pulse pair an inverted pulse delayed half the desired pulse interval, producing in response to the first produced pulse a second produced pulse again inverted and delayed half the desired pulse interval, producing in response to the second produced pulse a third produced pulse again inverted and delayed half the desired pulse interval, producing in response to the second pulse of the incoming pulse pair a fourth produced pulse inverted and delayed half the desired pulse interval, combining all said produced pulses, producing a signal in response to and for the duration of coincidence between said third and fourth produced pulses, and producing an output in response to coincidence signals having said predetermined duration.

5. A method of selecting pulse pairs having a predetermined interval and duration comprising, producing in response to the first pulse of an incoming pulse pair an inverted pulse delayed an interval equivalent to the desired pulse duration, producing in response to the first produced pulse a second produced pulse again inverted and delayed an interval equivalent to the desired pulse duration, producing in response to the second produced pulse a third pulse again inverted and delayed an interval equivalent to the desired pulse duration, producing in response to the second pulse of the incoming pulse a pair a fourth produced pulse inverted and delayed an interval equivalent to the desired pulse duration, combining all said produced pulses, and producing a signal in response to and for the duration of coincidence between said third and fourth produced pulses, and producing an output in response to coincidence signals having the desired pulse duration.

6. A pulse interval discriminator comprising, a transmission line section having input terminals at one end and a short circuit at the other end, said line having an electrical length such that a signal will travel down the line and back during half of the pulse interval to be selected, means applying a pulse group to said input terminals, means also connected to said terminals for combining said pulse group and its delayed components, amplitude responsive means receiving said combined pulses and producing an output from combined pulses having a predetermined amplitude and polarity.

7. A pulse interval discriminator comprising, a tranmission line section having input terminals at one end and a short circuit at the other end, said line having an electrical length such that a signal will travel down the line and back during half of the pulse interval to be selected, means applying a pulse group to said input terminals, means also connected to said terminals for combining said pulse group and its delayed components, amplitude responsive means receiving said combined pulses and producing an output from combined pulses having a predetermined amplitude and polarity, and duration responsive means connected to the output of said amplitude responsive means.

CONRAD H. HOEPPNER.
HENRY R. MURPHY.
NEIL CLARK, JR.

REFERENCES CITED

The following references are of record in the file of this patent:

UNITED STATES PATENTS

| Number | Name | Date |
|---|---|---|
| 2,255,839 | Wilson | Sept. 16, 1941 |
| 2,359,447 | Seeley | Oct. 3, 1944 |